US010995949B2

(12) United States Patent
Schreiner et al.

(10) Patent No.: US 10,995,949 B2
(45) Date of Patent: May 4, 2021

(54) METHOD FOR OPERATING A CLAUS BURNER

(71) Applicant: Messer Industries USA, Inc., Bridgewater, NJ (US)

(72) Inventors: Bernhard Schreiner, Oberhaching (DE); Xiaoping Tian, Pinchbeck (GB)

(73) Assignee: Messer Industries USA, Inc., Wilmington, DE (US)

( * ) Notice: Subject to any disclaimer, the term of this patent is extended or adjusted under 35 U.S.C. 154(b) by 41 days.

(21) Appl. No.: 16/321,990

(22) PCT Filed: Jul. 29, 2017

(86) PCT No.: PCT/EP2017/069255
§ 371 (c)(1),
(2) Date: Jan. 30, 2019

(87) PCT Pub. No.: WO2018/020047
PCT Pub. Date: Feb. 1, 2018

(65) Prior Publication Data
US 2020/0182459 A1    Jun. 11, 2020

(30) Foreign Application Priority Data
Jul. 29, 2016    (EP) .................................... 16001682

(51) Int. Cl.
*F23D 14/22*    (2006.01)
*C01B 17/04*    (2006.01)
(Continued)

(52) U.S. Cl.
CPC .......... *F23D 14/22* (2013.01); *C01B 17/0417* (2013.01); *F23D 14/76* (2013.01);
(Continued)

(58) Field of Classification Search
CPC .......... F23D 14/22; F23D 14/32; F23D 14/76; F23D 14/78; F23L 7/007;
(Continued)

(56) References Cited

U.S. PATENT DOCUMENTS 6,352,680 B1 * 3/2002 Watson .................. C01B 17/04
423/573.1
7,610,761 B2 * 11/2009 Carroni ................. B01F 5/0453
60/723
(Continued)

FOREIGN PATENT DOCUMENTS

| EP | 0 059 412 A2 | 9/1982 |
|---|---|---|
| EP | 2 988 067 A1 | 2/2016 |
| FR | 2 918 295 A1 | 1/2009 |

OTHER PUBLICATIONS

Mahin Rameshni, Equipment Evaluation for Oxygen Enrichment Revamps, Sulphur, Jan. 1, 2003, pp. 43-47, vol. XP-01141979—Issue No. 284, British Sulphur Publishing, London, GB.
(Continued)

*Primary Examiner* — Alfred Basichas
(74) *Attorney, Agent, or Firm* — Joshua L. Cohen

(57) ABSTRACT

In order to overcome the limitations and problems that earlier methods have experienced, a method for operating a burner used in the thermal step of a Claus process is disclosed. The burner has at least one combustion air port, at least one oxygen port, and at least one fuel port. The oxidant flow is made up of an oxygen flow of technical pure oxygen with an oxygen concentration of at least 90 vol. %, preferably at least 99 vol. %, and if necessary of a second gas flow, and it is determined whether the oxygen flow is below a pre-set minimum flow and if the oxygen flow is below a pre-set minimum flow the air flow is split into a main air flow and a side air flow and the oxygen flow is combined with the side air flow creating an oxygen-enriched side air
(Continued)

flow which is fed to the oxygen port. A corresponding burner is also disclosed.

12 Claims, 1 Drawing Sheet

(51) Int. Cl.
  *F23D 14/76* (2006.01)
  *F23D 14/78* (2006.01)
  *F23L 7/00* (2006.01)

(52) U.S. Cl.
  CPC .............. *F23D 14/78* (2013.01); *F23L 7/007* (2013.01); *F23L 2900/07006* (2013.01); *F23L 2900/07007* (2013.01)

(58) Field of Classification Search
  CPC .. F23L 2900/07006; F23L 2900/07007; C01B 17/0417; Y02E 20/344
  See application file for complete search history.

(56) References Cited

U.S. PATENT DOCUMENTS

| | | | |
|---|---|---|---|
| 8,663,589 B2* | 3/2014 | Graville | .............. C01B 17/0404 423/220 |
| 2003/0108839 A1* | 6/2003 | Watson | .................. F23D 14/32 431/207 |
| 2011/0073051 A1 | 3/2011 | Taniguchi et al. | |

OTHER PUBLICATIONS

International Search Report for PCT/2017/069255, dated Nov. 16, 2017, Authorized Officer: Enrico Coli, 3 pages.

* cited by examiner

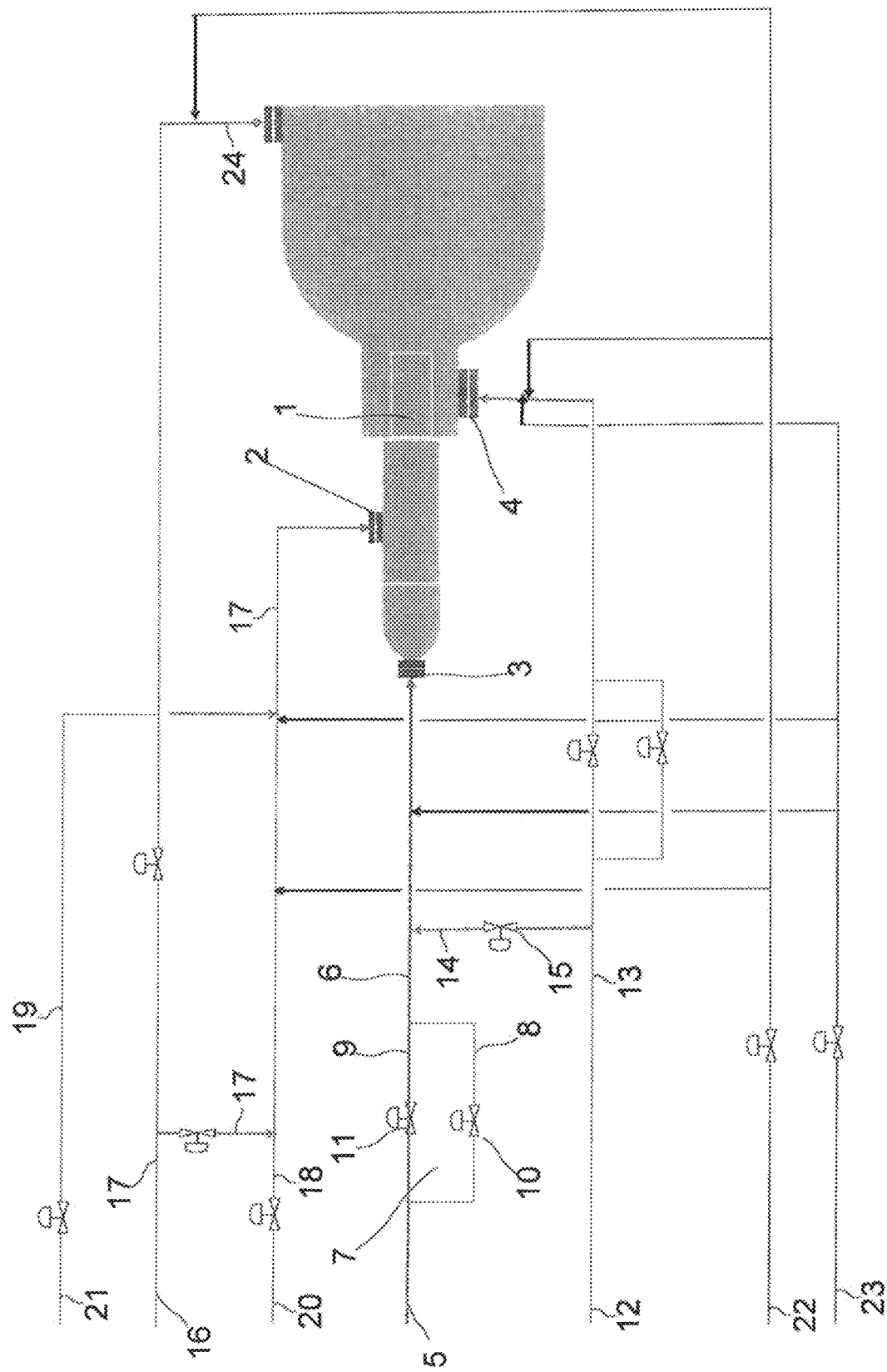

METHOD FOR OPERATING A CLAUS BURNER

CROSS-REFERENCE TO RELATED APPLICATIONS

This application claims priority under 35 USC § 119 to International Patent Application No. PCT/EP2017/069255, filed an Jul. 29, 2017 which claims priority from European Patent Application 16001682.0, filed on Jul. 29, 2016.

BACKGROUND OF THE INVENTION

The present invention relates to a method for operating a burner used in the thermal step of a Claus process, wherein the burner comprises at least one combustion air port, at least one oxygen port, and at least one fuel port, and wherein an air flow is fed to the combustion air port, an oxidant flow is fed to the oxygen port, and a hydrogen sulphide ($H_2S$) containing feed gas flow is fed to the fuel port.

Sulphur recovery units based on the so-called "Modified Claus Process" produce elemental sulphur from feed gases with high concentration in $H_2S$. In a thermal process step, the feed gas is partially combusted in a free flame reaction within a combustion chamber.

In some cases oxygen enriched air or pure oxygen is used as the primary oxidant in the thermal Claus step. Increasing the oxygen content by addition of technical oxygen combined with reduction of combustion air reduces the overall amount of oxidation gas fed into the Claus plant and cuts the amount of nitrogen ballast transported through the system.

This brings the following advantages:
- pave way for increased throughput of $H_2S$ feed;
- increase of temperature within the Claus furnace which in turn increases operational stability; for example by more efficient destruction of detrimental feed components like for example BTX (mixture of benzene, toluene, and the three xylene isomers) and/or ammonia ($NH_3$);
- potentially save operation costs due to less energy requirement;
- minimize operational problems within the Claus unit caused by precipitation of ammonia salts.

In the prior art the following operation modes of oxygen enrichment in the Claus thermal step are known:

Low-level oxygen enrichment can be implemented without having to replace the Claus burner designed for use with process air only. This method intensifies the Claus process with only very little adjustment to existing facilities. In low-level oxygen enrichment oxygen is admixed to the process air fed up to a maximum concentration of typically 28 percent by volume.

If oxygen accounts for more than 28 percent by volume of process air, additional measures have to be taken to introduce the oxygen into the Claus process. In this so-called mid-level oxygen enrichment mode oxygen is fed into the Claus chamber by one or more separate oxygen lances up to a concentration of about 45 percent by volume.

If the operator wishes to increase the oxygen content to even higher levels other extensive alterations to the plant design and characteristics have to be done. For example the oxygen can be fed by oxygen lances combined with process characteristics like staged combustion or process gas recycle. The latter correspond to the so-called high-level oxygen enrichment mode.

The above mentioned operation modes allow to increase the oxygen content up to high enrichment levels. However, even if it is possible to achieve enrichment levels of approximately 45 percent by volume by using mid-level oxygen enrichment or high-level oxygen enrichment, both operation modes are limited as both technologies can only be run in air-only mode or at enrichment levels of more than approximately 28 percent by volume.

None of the operation modes is capable of covering enrichment levels from 21 percent by volume to approximately 45 percent by volume. Levels above approximately 28 percent by volume cannot be covered by low-level enrichment, levels between 21 percent by volume and approximately 28 percent by volume cannot be covered by mid-level enrichment.

The upper limit depends on the burner specifics. But in any case there is a gap in terms of steplessly adjustable oxygen enrichment. The reason is that the oxygen lances used in mid-level enrichment require a certain minimum gas flow in order to assure sufficient cooling of the lance material in the hot combustion chamber environment.

SUMMARY OF THE INVENTION

Starting from the disadvantages and shortcomings as described above as well as taking the prior art as discussed into account, an object of the present invention is to provide a method which is capable of closing the described gap between 21 percent by volume and approximately 28 percent by volume oxygen enrichment.

This object is achieved by a method for operating a burner used in the thermal step of a Claus process, wherein the burner comprises at least one combustion air port, at least one oxygen port, and at least one fuel port and wherein an air flow is fed to the combustion air port, an oxidant flow is fed to the oxygen port, and a hydrogen sulphide containing feed gas flow is fed to the fuel port, and which is characterized in that the oxidant flow is made up of an oxygen flow of technical pure oxygen with an oxygen concentration of at least 90 percent by volume (vol. %), preferably at least 99 vol. %, and if necessary of a second gas flow, and that it is determined whether the oxygen flow is below a pre-set minimum flow and if the oxygen flow is below a pre-set minimum flow the air flow is split into a main air flow and a side air flow and the oxygen flow is combined with the side air flow creating an oxygen-enriched side air flow which is fed to the oxygen port.

Advantageous embodiments and expedient improvements of the present invention are disclosed in the respective dependent claims.

According to the present invention the mid-level oxygen enrichment mode is extended to enrichment levels below 28 percent by volume. In the prior art a burner used for mid-level oxygen enrichment comprises an combustion air port which is connected to a source of air, a fuel port which is connected to a source of hydrogen sulphide ($H_2S$) containing feed gas and an oxygen port which is connected to a source of technical pure oxygen.

The prior art burner can be operated in air-only mode in which feed and air are supplied to the burner and fed into the combustion chamber or furnace via the fuel port and the combustion air port, respectively. When the burner is switched to mid-level oxygen enrichment mode oxygen is supplied to the oxygen ports and the combustion air flow is reduced accordingly in order to maintain the total oxygen flow to the furnace.

However, as the oxygen port is in contact with the hot furnace atmosphere it is necessary to have a certain minimum flow of oxygen to the oxygen port in order to sufficiently cool the oxygen port. Thus, in the prior art mid-level oxygen enrichment was only possible at enrichment levels above about 28 percent by volume oxygen.

According to the present invention in the air-only mode combustion air is fed to both the combustion air port as well as to the oxygen port. When the enrichment level shall be increased, the combustion air flow is split into a main air flow and into a smaller side air flow.

The main air flow is still passed to the combustion air port. The side flow of air is passed to the oxygen port. For oxygen enrichment oxygen is fed into the side air flow rather than into the main air flow as in the prior art. The resulting mixture of air and oxygen is fed to the oxygen port and then into the furnace.

Thus, according to the present invention the oxygen port is cooled by the oxygen flow and by the side air flow. When the oxygen flow is too low to sufficiently cool the oxygen port, a portion of the air flow is split off, fed as side air flow to the oxygen port in order to assist the cooling.

The minimum oxygen flow required for sufficient cooling of the oxygen port is pre-determined and a minimum flow is pre-set. If in normal use the oxygen flow falls below or is below the pre-set minimum flow, an air flow is also passed to the oxygen port for cooling purposes.

The inventive method allows to operate the burner at oxygen levels between 21 percent by volume, that is air-only mode, up to an enrichment level of about 45 percent by volume without any gap inbetween. Thus, the present invention allows to operate the burner in air-only mode, in low-level oxygen enrichment mode and in mid-level oxygen enrichment mode.

Prior art low-level oxygen enrichment has been realized by injecting oxygen into the main air flow. The resulting oxygen enriched main air flow has been fed to the burner and introduced into the furnace. However, the burner is normally designed such that the fuel port and the oxygen port are close to each other and the combustion air port is located at a certain distance.

Ammonia often accounts for up to fifteen percent of the $H_2S$ containing feed gas or even more. Down-stream the Claus furnace ammonia can cause a number of problems, ranging from reduced capacity, operational disruptions to corrosive damage to materials and lower desulphurisation rates. In light of these problems, it is important to maximize ammonia oxidation.

According to the present invention even in low-level oxygen enrichment mode the oxygen is introduced into the furnace via the oxygen port(s). The oxygen is introduced very close to the burner flame or even into the burner flame.

Thus, the oxygen enters the furnace exactly at the location where the ammonia concentration is highest. Thereby, the efficiency of the oxidation and destruction of the ammonia is considerably increased. This also holds if low-level oxygen enrichment is applied without increasing design capacity of the Claus unit.

According to a preferred embodiment an oxygen supply line is provided between a source of technical pure oxygen and the oxygen port and the oxygen supply line comprises a flow control unit located upstream of the point where the oxygen flow is fed into the side air flow, and the flow control unit comprises a low level enrichment control valve and in parallel a mid level enrichment control valve.

The oxygen flow to the oxygen port may be controlled by the flow control unit. The flow control unit may comprise two parallel branches with a low-level enrichment control valve in one of the branches and with a mid-level enrichment control valve in the other branch or line.

The low-level enrichment control valve may be designed for a lower maximum oxygen flow. The maximum oxygen flow through the low-level enrichment control valve may correspond to an oxygen enrichment level of about 28 percent by volume. On the other hand, the mid-level enrichment control valve may be designed for higher oxygen flows corresponding to oxygen enrichment levels between approximately 28 percent and approximately 45 percent by volume.

As the low-level enrichment control valve is designed for lower flows it can be more precise than the mid-level enrichment control valve. Thus, for low-level oxygen enrichment the mid-level enrichment control valve is closed and the oxygen flow can be precisely controlled by the low-level enrichment control valve. In the mid-level oxygen enrichment mode the mid-level enrichment control valve is used to control the oxygen flow.

The low-level enrichment control valve can either be closed or fully opened or it can be used for fine-control of the oxygen flow. The use of the low-level enrichment control valve and the mid-level enrichment control valve allows to achieve a smooth transition from low-level enrichment to mid-level enrichment without the need for purging with nitrogen.

According to a preferred embodiment the feed gas flow is made up
  of a first gas feed stream comprising hydrogen sulphide ($H_2S$) but essentially no ammonia ($NH_3$) which may be by-passed around the Claus burner, and
  of a second feed gas stream comprising hydrogen sulphide ($H_2S$) and up to 50 percent by volume ammonia ($NH_3$), preferably at least 30 percent by volume ammonia ($NH_3$).

According to another preferred embodiment the oxygen port is designed as one or more oxygen lances. The oxygen flow is introduced into the Claus furnace as a pressurized gas by means of a steel lance.

Current low level enrichment uses an injector to inject oxygen into main combustion air pipework to ensure complete mixing after a short distance down-stream the oxygen injection point. In this combined method, oxygen flow is introduced directly to the oxidant ports along with part of the combustion air, the complete mixing of oxygen and air before entering the furnace chamber is achieved without a special injection and/or mixing device as a tubelength to tubediameter ratio of more than 20 is ensured by design.

The inventive method also allows the use of oxygen for temperature enhancement at partial load. This oxygen enriched operation in the low-level mode is often of interest as high ammonia concentration or other impurities (for example BTX) in the Claus feed normally occur independently from plant load, i.e. also usual load conditions or below. The prior art mid-level enrichment operation is designed to overcome hydraulic limitation at full air operation capacity only.

The present invention further relates to a burner operated by a method of the above-described type.

BRIEF DESCRIPTION OF THE DRAWINGS

For a more complete understanding of the present inventive embodiment disclosures and as already discussed above, there are several options to embody as well as to improve the teaching of the present invention in an advantageous manner. To this aim, reference may be made to the claims dependent on claim 1; further improvements, features and advantages of the present invention are explained below in more detail with reference to the following description of a preferred embodiment by way of non-limiting example and to the appended drawing FIGURE taken in conjunction with the description of the embodiment, of which:

The FIGURE shows the flow schematics for carrying out the inventive method

DETAILED DESCRIPTION OF THE INVENTION

Before explaining the present inventive embodiment in detail, it is to be understood that the embodiment is not limited in its application to the details of construction and arrangement of parts illustrated in the accompanying drawing, since the present invention is capable of other embodiments and of being practiced or carried out in various ways. Also, it is to be understood that the phraseology or terminology employed herein is for the purpose of description and not of limitation.

In the following description, terms such a horizontal, upright, vertical, above, below, beneath and the like, are used solely for the purpose of clarity illustrating the invention and should not be taken as words of limitation. The drawings are for the purpose of illustrating the invention and are not intended to be to scale.

The FIGURE shows the flow schematics for carrying out the inventive method. A burner 1 comprises one or more fuel ports 2, one or more oxygen ports 3, and one or more combustion air ports 4. The burner 1 is used in the thermal step of a Claus plant for partial oxidation of $H_2S$.

The oxygen port 3 is connected to a source 5 of technical pure oxygen via an oxygen supply line 6. The oxygen has a purity of at least 90 percent by volume, preferably of at least 95 percent by volume, and more preferably of at least 99 percent by volume.

The oxygen supply line 6 comprises a flow control unit 7 wherein the flow control unit 7 comprises two parallel flow paths 8 and 9 with a low-level enrichment control valve 10 in flow path 8 and with a mid-level enrichment control valve 11 in flow path 9.

Low-level enrichment control valve 10 and mid-level enrichment control valve 11 are control valves to control the flow of oxygen from the oxygen source 5. Low-level enrichment control valve 10 is designed for lower oxygen flows and higher precision whereas mid-level enrichment control valve 11 is designed for higher oxygen flows.

The combustion air port 4 is connected to an air source 12 via an air supply line 13. The air source 12 could be an air compressor for supplying air as an oxidant to the combustion process.

The oxygen supply line 6 and the air supply line 13 are connected via line 14 which is provided with a flow control valve 15 for controlling the side air flow from air supply line 13 to oxygen supply line 6. Via fuel supply line 17 the fuel port 2 is connected to a source 16 of acid gas, that is a feed gas containing hydrogen sulphide ($H_2S$). Additional lines 18, 19 are connected to the fuel supply line 17 and may be used for supply of sour water stripper (SWS) gases 20 or another fuel gas 21 to the fuel port 2.

The burner could be controlled to allow several modes of operation by varying the gas streams to the different burner ports:
- start-up/hot stand-by mode;
- air operation mode;
- low-level oxygen enrichment operation mode;
- mid-level oxygen enrichment operation mode.

Start-Up and Hot Stand-by Mode:

For cold start the Claus unit is provided with fresh catalyst and there is no sulphur in the unit. For future restarts, the Claus unit already contains sulphur compounds and the burner 1 will be started by firing fuel gas (for example hydrocarbons) 21 and combustion air 12 in stoichiometric conditions.

In this mode, the combustion air flow 12 goes to both the oxygen ports 3 and the combustion air port 4. Flow control unit 7 in the oxygen supply line 6 is closed so that oxygen flow to the oxygen port 3 is disabled.

Fuel gas (hydrocarbons) 21 is introduced through the fuel port(s) 2 and the flame is ignited. Once the flame is stable, the total combustion air 12 (supplied via the oxygen port 3 and the combustion air port 4) and the fuel gas (hydrocarbons) flow 21 are set at a ratio slightly sub-stoichiometric.

A gradual temperature rise is controlled by increasing the fuel gas (hydrocarbons) 21 and the combustion air flow 12. Steam 22 can be added to the fuel gas 21 to prevent soot formation while firing at sub-stoichiometric firing conditions and to provide cooling at stoichiometric firing conditions.

Air Operation Mode;

Once the furnace is hot and the rest of the Claus unit is at operating temperature, acid gas ($H_2S$ feed) 16 may be introduced to the process. Acid gas flow 16 is fed to the fuel ports 2 via supply line 17. The acid gas 16 is a gas stream containing hydrogen sulphide. Acid gas flow 16 is increased in small steps and followed by a gradual reduction of the fuel gas (hydrocarbons) flow 21.

Combustion air 12 goes to both the oxygen ports 3 and the combustion air ports 4. The total air flow 12 is calculated and set to the correct amount of air required for both fuel gas 21 and acid gas 16.

Low-Level Oxygen Enrichment Operation Mode:

Low-level oxygen enrichment can be used to increase furnace temperature for ammonia destruction and/or for incremental capacity increase. While at air operation mode, once a minimum of load is reached, oxygen can be introduced through the low-level enrichment control valve 10.

The combustion air 12 still goes to both the oxygen ports 3 and the combustion air port 4. The combustion air flow 12 is split in a main air flow which is passed to the combustion air port 4 and a side air flow which is passed to the oxygen ports 3. The split of the main air flow and the side air flow is based on a pre-set percentage.

With the increase in oxygen flow 5, the total combustion air flow 12 is reduced, and then split to the pre-set ratio before they go to the oxygen port 3 and the combustion air port 4. With oxygen enrichment, the acid gas by-pass 24 is disabled.

Once the oxygen flow 5 reaches the pre-set minimum flow for the oxygen port 3, any further increase in oxygen enrichment will require moving to the mid-level oxygen enrichment mode.

Mid-Level Oxygen Enrichment Operation Mode:

Once the oxygen flow is above the oxygen ports 3 pre-set minimum flow requirement, it can be switched to the mid-level enrichment mode if there is sufficient increase in throughput. The side air flow (of the combustion air 12) to the oxygen ports 3 is disabled in this mode. All the combustion air 12 will flow to the combustion air ports 4.

As the oxygen flow 5 still goes to the oxygen ports 3 and it is above the pre-set minimum flow setting, there is no nitrogen make-up flow required during the transition. The overall operation point and its flow rates to all the ports can be maintained during the transition.

In the mid-level oxygen enrichment mode, the overall oxygen enrichment level can be manually inputted. Feed forward control of the combustion air 12 is based on the acid gas flow 16, taking into consideration of oxygen enrichment, and feedback control of combustion air 12 is based on the tail gas analyser, as described above.

Shutdown:

One of the primary shut downs while in oxygen enrichment modes is high temperature. When the temperature exceeds a certain maximum temperature the oxygen flow 5 will be disabled. Nitrogen flow 23 will be automatically switched on to maintain a pre-set minimum flow to the oxygen ports 3 in order to provide cooling. If the temperature continues to rise the unit is shut down.

During the shutdown, the minimum flow to the three ports 2, 3, 4 remains enabled. The purge rates required to protect the burner 1 during shutdown are lower than the minimum flow requirement. The flows may be reduced to the specified purge rates for a continued shutdown.

When the furnace temperature drops below a certain temperature, the purge flow to the combustion air ports 4 and the fuel ports 2 can be switched off.

However, the purge flow to the oxygen ports 3 must be continued until completely shut down at a further reduced rate. This prevents back flow contamination of the oxygen equipment and lines.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

LIST OF REFERENCE SIGNS 1 burner
2 fuel port
3 oxygen port, in particular at least one oxygen lance
4 combustion air port
5 source of oxygen, in particular of technical pure oxygen
6 oxygen supply line
7 flow control unit
8 first flow path, in particular with low-level enrichment control valve 10
9 second flow path, in particular with mid-level enrichment control valve 11
10 low-level enrichment control valve, in particular designed for lower oxygen flow
11 mid-level enrichment control valve, in particular designed for higher oxygen flow
12 air source, in particular air compressor, for example for supplying air as an oxidant to the combustion process
13 air supply line
14 line
15 flow control valve
16 source of acid gas, in particular of $H_2S$
17 fuel supply line
18 first additional line
19 second additional line
20 sour water stripper (SWS) gas
21 fuel gas, in particular hydrocarbon
22 steam
23 nitrogen flow
24 acid gas by-pass

What we claim is:

1. A method for operating a burner used in a thermal step of a Claus process, wherein the burner includes at least one combustion air port, at least one oxygen port, and at least one fuel port, and
   wherein an air flow is fed to the at least one combustion air port, an oxidant flow is fed to the at least one oxygen port, and a hydrogen sulphide containing feed gas flow is fed to the at least one fuel port, comprising:
   feeding the oxidant flow which includes an oxygen flow of technical pure oxygen with an oxygen concentration of at least 90 vol. % to the at least one oxygen port and optionally feeding a second gas flow to the oxygen flow for providing a mixture of air and oxygen to the at least one oxygen port;
   determining whether the oxygen flow is below a pre-set minimum flow at the at last one oxygen port; and
   splitting the air flow if the oxygen flow is below the pre-set minimum flow into a main air flow fed to the at least one combustion air port, and a side air flow as the second gas flow to be combined with the oxygen flow for creating an oxygen-enriched side air flow fed to the at least one oxygen port.

2. The method of claim 1, further comprising controlling the air flow based upon an acid gas flow in the hydrogen sulphide containing feed gas flow and on the oxygen flow.

3. The method of claim 1, further comprising controlling the air flow based upon analysis of tail gas leaving the Claus process.

4. The method of claim 1, wherein the hydrogen sulphide containing feed gas flow comprises:
   a first gas stream including hydrogen sulphide but essentially no ammonia; and
   a second gas stream including hydrogen sulphide and up to 50 percent by volume ammonia.

5. The method of claim 4, wherein the second gas stream includes the hydrogen sulphide and at least 30 percent by volume ammonia.

6. The method of claim 1, further comprising enriching the oxygen concentration for increasing a temperature of the burner in the Claus process for oxidation and destruction of ammonia.

7. A burner of a Claus plant, comprising:
   at least one combustion air port, at least one oxygen port, and at least one fuel port;
   a side supply line through which a side flow of air is provided upstream of the at last one oxygen port;
   an oxygen supply line connecting a source of technical pure oxygen with the at least one oxygen port, the oxygen supply line including a flow control unit operatively associated with the side supply line, the flow control unit including a first branch through which a first oxygen flow passes and a second branch through which a second oxygen flow passes with a higher percent by volume amount of oxygen than the first oxygen flow, wherein each of the first and second branches are controlled for providing oxygen to the side air flow of the side supply line based upon whether an oxygen flow at the at least one oxygen port is below a pre-set minimum flow.

8. The burner of claim 7, wherein the flow control unit is located upstream of a point where either of the first and second oxygen flows are fed into the side air flow.

9. The burner of 8, wherein the first branch comprises a low-level enrichment control valve, and the second branch comprises a mid-level enrichment control valve.

10. The burner of claim 9, wherein the low-level enrichment control valve and the mid-level enrichment control valve are arranged in parallel.

11. The burner of claim 7, wherein the at least one oxygen port is located closer to the at last one fuel port than to the at least one combustion air port.

12. The burner of claim 7, wherein the at least one oxygen port comprises an oxygen lance or alternatively a plurality of oxygen lances.

\* \* \* \* \*

UNITED STATES PATENT AND TRADEMARK OFFICE
CERTIFICATE OF CORRECTION

PATENT NO. : 10,995,949 B2
APPLICATION NO. : 16/321990
DATED : May 4, 2021
INVENTOR(S) : Bernhard Schreiner et al.

Page 1 of 1

It is certified that error appears in the above-identified patent and that said Letters Patent is hereby corrected as shown below:

In the Claims

Claim 1, Column 8, Line 18, delete "last" and insert therefore -- least --.
Claim 7, Column 8, Line 48, delete "last" and insert therefore -- least --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*